No. 853,115. PATENTED MAY 7, 1907.
T. REUSS.
CYCLE WHEEL GUARD.
APPLICATION FILED MAR. 30, 1905. RENEWED MAR. 14, 1907.
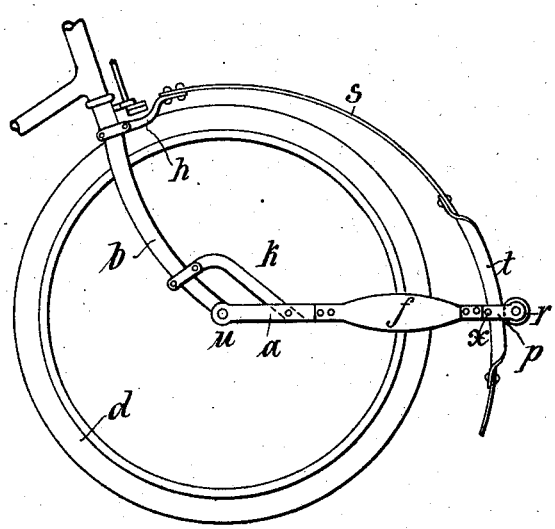
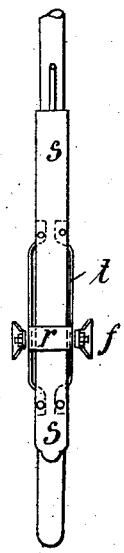
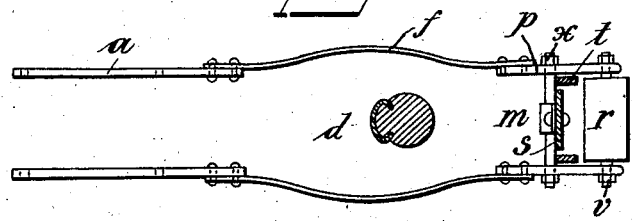
Witnesses
Paul Max
C. Kreham
Inventor
Theodor Reuss

UNITED STATES PATENT OFFICE.

THEODOR REUSS, OF KÖTZSCHENBRODA, GERMANY.

CYCLE WHEEL-GUARD.

No. 853,115.   Specification of Letters Patent.   Patented May 7, 1907.

Application filed March 30, 1905. Renewed March 14, 1907. Serial No. 362,413.

*To all whom it may concern:*

Be it known that I, THEODOR REUSS, merchant, a subject of the German Emperor, and a resident of 36 Meissnerstrasse, in Kötzschenbroda, a small place in the Kingdom of Saxony, German Empire, have invented certain new and useful Improvements in Cycle Wheel-Guards, of which the following is a specification.

My invention relates to an improved wheel guard or protector, more especially adapted for the front wheel of bicycles.

The essential feature of the invention is the provision of two composite stays or arms secured to the axle of the wheel and located one on each side of the latter, each stay embodying a member of a flexible character; in combination with a guard-plate or like device secured in front of the wheel.

My invention is illustrated in the accompanying drawing, in which

Figure 1 is an elevation of a portion of a cycle to the front wheel of which the new guard is fitted. Fig. 2 is an end elevation of Fig. 1; and Fig. 3 a sectional plan.

In the particular form of the protector illustrated, the guard plate, consists of a strong strip of sheet metal $s$ secured to the top of the ordinary front wheel fork $b$ and extending for a suitable distance downward in front of the tire $d$. The portion which lies more or less centrally of the wheel may be suitably strengthened, for example, by lateral sheet steel plates or strips $t$ or the like.

The stays consist of two arms, each comprising a rigid member $a$ secured at one end to the axle $u$, and another rigid member $p$ secured to the said guard-plate $s$, and a flexible member (shown as a flat spring) $f$ connecting the two said rigid members $a$ $p$. The inner rigid members $a$ may receive support in any suitable manner, for instance from bent arms $k$ holding them to the limbs of the usual wheel fork $b$. The front rigid members $p$ may be secured together, before the wheel, by means of one or more bolts or pins $x$ to which the guard plate is likewise secured. Or they may be formed in a single piece.

An extra pin $v$ may be provided at the extreme outer ends of these front members $p$ so as to form the axis for a small roller or wheel $r$. The advantage of such a rotary device is that it prevents the cycle wheel from mounting the wheel of another velocipede or vehicle with which it may collide.

Having thus described my invention, what I claim as new is:—

1. A cycle wheel protector, comprising a guard located in front of the wheel and carried by the cycle frame, and a flexible arm at each side of the wheel, carried at one end by the axle and secured at the other end to the said guard, substantially as described.

2. A cycle wheel protector, comprising a guard located in front of the wheel, and carried by the cycle frame, and a composite arm at each side of the wheel, presenting an intermediate flexible member, said arms being carried at one end by the axle and secured at the other end to the said guard, substantially as described.

3. A cycle wheel protector, comprising a guard located in front of the wheel and carried by the cycle frame, a flexible arm at each side of the wheel, carried at one end by the axle and secured at the other end to the said guard, and a revolving device mounted at the other extremity of the said arms, substantially as described.

4. A cycle wheel protector, comprising a guard located in front of the wheel and carried by the cycle frame, and a flexible arm at each side of the wheel, one end of which arm is carried by the axle and is secured to the wheel fork, while the other end is secured to the said guard, substantially as described.

In witness whereof I have hereunto signed my name this 11th day of March 1905, in the presence of two subscribing witnesses.

THEODOR REUSS.

Witnesses:
 PAUL E. SCHILLING,
 PAUL ARRAS.